United States Patent [19]

D'Aloia

[11] 4,183,707

[45] Jan. 15, 1980

[54] DOOR FOR A MAIL SORTING BIN

[75] Inventor: Andrew D'Aloia, New York, N.Y.

[73] Assignee: American Technical Industries, Inc., Mt. Vernon, N.Y.

[21] Appl. No.: 886,799

[22] Filed: Mar. 15, 1978

[51] Int. Cl.[2] ........................ B65B 21/02; B65G 43/00

[52] U.S. Cl. .................................... 414/414; 414/134; 198/370; 198/704; 414/265; 209/900

[58] Field of Search ..................... 214/11 R, 302, 307; 220/335; 298/24–27, 29–37; 209/698, DIG.900; 49/386; 198/369, 370, 366, 704; 414/134, 265, 414

[56] References Cited

U.S. PATENT DOCUMENTS

| | | | |
|---|---|---|---|
| 2,764,275 | 9/1956 | Lens | 198/704 |
| 3,144,948 | 8/1964 | Henig | 214/11 R |
| 3,563,479 | 2/1971 | Brouwer | 198/352 |
| 3,573,748 | 4/1971 | Holme | 214/11 R |
| 4,022,340 | 5/1977 | D'Aloia | 214/11 X |

*Primary Examiner*—Stephen G. Kunin

*Assistant Examiner*—R. B. Johnson

*Attorney, Agent, or Firm*—Hopgood, Calimafde, Kalil, Blaustein & Lieberman

[57] ABSTRACT

An improved door is provided for a mail sorting bin which is made of a resilient noise damping material and includes a trip lever integrally formed with the door. The trip lever is substantially coplanar with the door and has a first portion extending outwardly from a first transverse end of the door, a second portion which extends generally outwardly and downwardly from the first portion to engage the movable lever which holds the door shut, and a third portion which extends upward to a point even with the upper edge of the door and to define an aperture between the trip lever and the door. The door is attached between the sides of a mail sorting bin such that one side of the bin extends through this aperture. A tab, may also be formed integrally with the door so that it extends outwardly from the opposite transverse end of the door. This tab is positioned to be engaged by a spring which urges the door open.

13 Claims, 8 Drawing Figures

DOOR FOR A MAIL SORTING BIN

BACKGROUND OF THE INVENTION

The present invention relates to a bin for use in a mail transporting apparatus, which includes a plurality of vertical slots closeable by pivotably movable doors and more particularly, to such a bin having an improved door construction which serves to reduce noise and vibration.

Mail transporting apparatus, such as those currently in use by the United States Post Office, employ mail sorting bins that are supported on rollers and travel through the sorting system on tracks. Each bin includes a plurality of parallel vertical slots. Each of the slots is open at its upper end to receive mail and closeable at its lower end by a pivotably movable door. The door includes a tab extending outwardly from a first end and a lever attached to the second end. The tab is configured to cooperate with a bias spring which urges the door into an open position. The lever is engaged by a cam surface on a rocker arm which holds the door in a closed position.

As the bin passes through the mail sorting system, mail is deposited in the slots through their respective open upper ends. As the bin passes over a location at which mail is to be discharged, the rocker arm holding the lever attached to the appropriate door is moved releasing the lever and permitting the bias spring to move the door to its open position. The mail then falls through the bottom of the slot.

When the metal doors closing each of the bin slots open to drop the mail the resulting metal to metal contact causes a loud unpleasant noise. A similar noise results on the closing of the door. The impact of the door opening and closing also causes undesirable vibrations within the bin which can cause increased maintenance problems. In addition to the noise of opening and closing doors the lever is detachably fixed to the second end of each door by a pin and tab arrangement which can rattle causing considerable noise. Lastly the doors which are held in closed position by the bias spring and tab, can and do move relative to the slotted side of the bin so that they rattle extensively as the bin moves. The noise eminating from a number of such bins each having a number of doors opening and closing rapidly is a formidable problem. The resulting noise can raise to the level of health hazzard for those who must work around a mail sorting system, and the resulting impacts cause extensive maintenance problems in the bins.

A partial solution to the above problem has been implemented by the United States Post Office in which the tab extending from the first end of each door is substantially coplanar with the door. Notches are cut in a side wall of the bin to permit each such tab to extend beyond the bin side wall where it is held between two torsion springs. The first such spring bias the door so that it opens and damps vibrations and noise when the door slams shut. The second torsion spring limits the movement of the door on opening. The springs associated with each door are carried by an arm supported by the axle about which an adjacent door is pivotable. Of course, the arm for the last door of the bin must be supported by a pin provided specifically for that purpose.

An improvement on the above described mail sorting bins utilized by the Post Office is disclosed in U.S. Pat. No. 4,022,340. In this patent the tab engaged by the damping torsion springs includes a first portion which extends at a right angle to the door and a second portion which extends parallel to the door to a point beyond the bin side wall. This arrangement eliminates the need for notches in the bin sides to accommodate the tabs.

Although the above solutions serve to decrease somewhat the metal to metal impact clatter of opening and closing doors they by no means eliminate it. The rattling of closed doors against the bin frame while again decreased by the bias torsion spring is still present. Neither of these solutions treat the problem of the rattling between the lever mechanism and the door.

The detachable lever arrangement of the prior art is a weak point in the bin which can fail if either the pin or tab which extends outwardly from the door to hold the lever in place are bent in use causing the door to jam open or closed. In addition the tab extending outwardly from the door end must of necessity fit loosely within a slot in the lever to hold the lever in proper substantially coplanar orientation relative to the door. This results in substantial rattling between the lever and the door tab. Similar rattling occurs between the lever, the pin holding the lever to the door and the door itself.

The door construction of the present invention provides a unitary door and lever thereby providing a stronger door and one in which no rattling can occur between the door and the trip lever. Noise resulting from the opening and closing of the door as well as the vibration of the door against bin structure is greatly decreased by providing a door of a resilient plastic material which damps clatter. The use of a plastic material for the door has the additional advantage that it permits a unitary molded structure including both the door and the lever to be inexpensively made.

SUMMARY OF THE INVENTION

An improved door for a mail transporting bin has first and second longitudinal side walls, and a plurality of transverse partitions disposed between the side walls to define a plurality of parallel vertical mail holding slots each of which is open at its upper end and closable at its lower end by one of a plurality of doors. Each such door is an elongated substantially rectangular member having first and second transverse end surfaces adjacent to the side walls of the bin and an upper and a lower longitudinal edges which are substantially perpendicular to the side walls of the bin. The door is pivotably mounted between the bin side walls about an axis adjacent to and extending along the upper longitudinal edge of the door. Bias means are provided to urge each door toward an open position and a moveable member is arranged to hold each such door in a normally closed position.

The improved door is made of a resilient sound damping material and includes a trip lever integrally formed therewith which is substantially coplanar with the body of the door. The trip lever includes a longitudinal portion which extends outwardly from the first transverse end of the door, a lever portion extending generally downwardly and outwardly from the longitudinal portion to a point where it is engagable by the moveable member to hold the door closed and an attachment portion which extends upwardly from the longitudinal portion to a point approximately even with the upper longitudinal edge of the door. The attachment portion is spaced from the first transverse end of the door to define an aperture.

Means are provided to pivotably attach the door between the longitudinal sides of the bin such that one side of the bin extends through the aperture defined by the attachment portion of the trip lever and the first transverse end of the door. A tab may be integrally formed with the door so that it projects from its second transverse end and is engageable by the bais means.

DESCRIPTION OF THE PREFERRED EMBODIMENT

Figure 1:
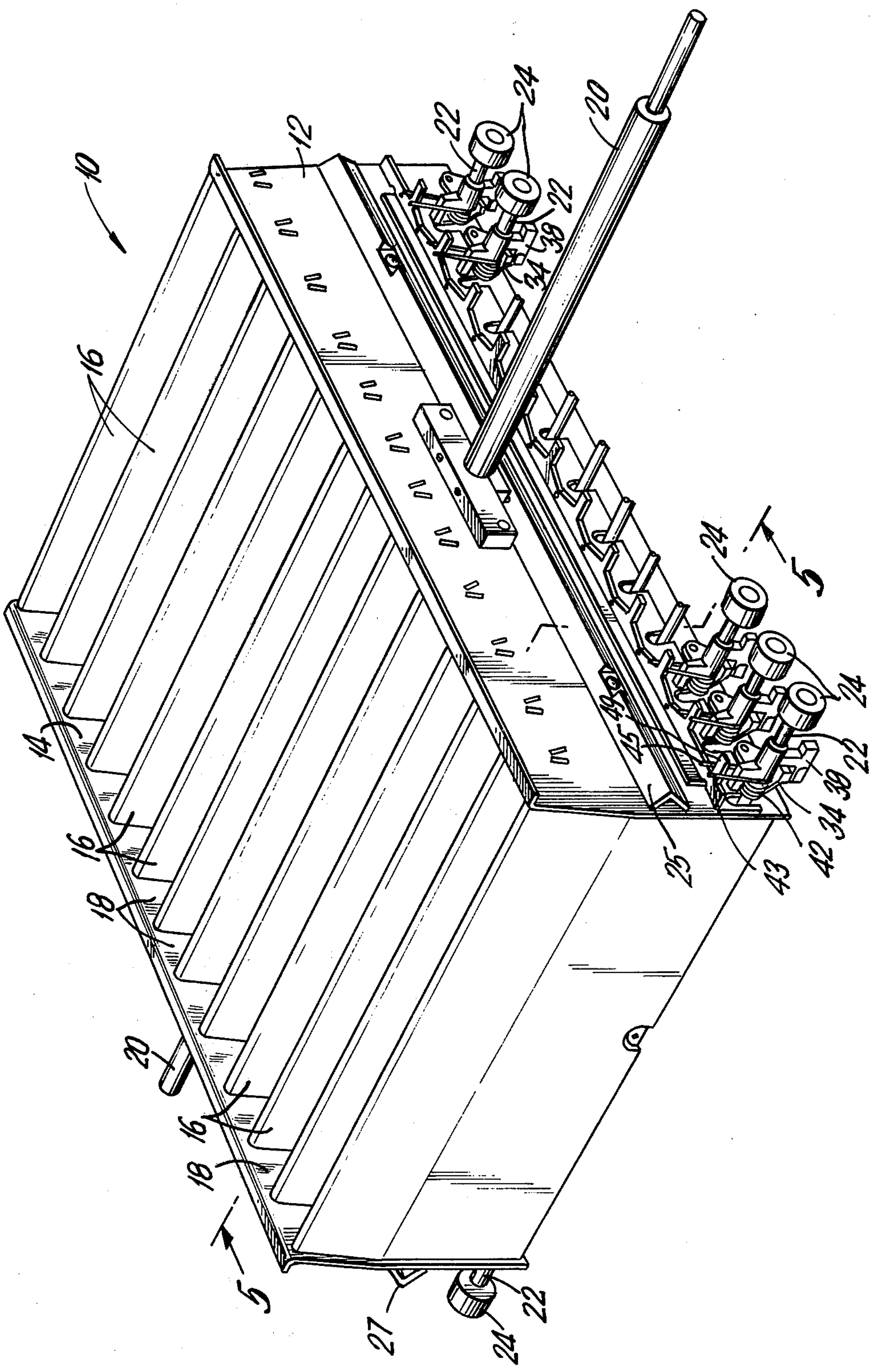
FIG. 1 is a perspective view of a mail sorting bin utilizing the improved doors of the present invention.

FIG. 1 shows a mail sorting bin 10 having opposed longitudinal sides 12 and 14 and a number of transversely disposed partitions 16 connected between sides 12 and 14. The space between partitions 16 defines a number of mail storage slots 18 having an opening at their upper end for the receipt of mail. In use the mail sorting bin 10 is supported by support shafts 20 and rollers 24 as it moves on tracks through a post office complex. The rollers 24 are mounted on shafts 22 which extend through the bin 10. Reinforcing members 25 and 27 may be attached respectively along bin walls 12 and 14 to strengthen these walls.

Figures 2, 3, 4:
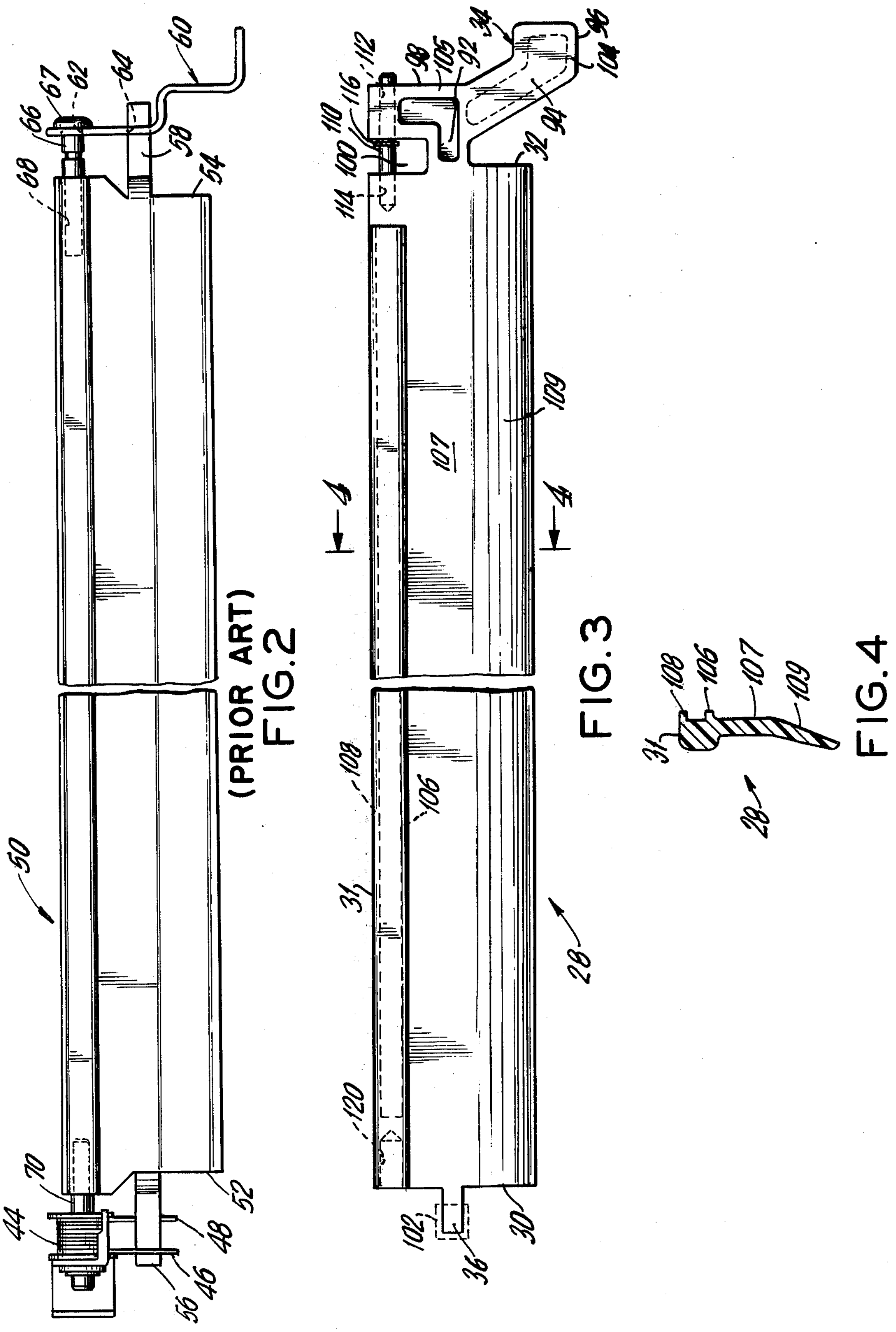
FIG.2 (PRIOR ART)
FIG. 2 is a frontal view of the prior art door which had been used with the mail sorting bin of FIG. 1.
FIG. 3 is a frontal view of the first embodiment of the improved door used with the mail sorting bin of FIG. 1.
FIG. 4 is a cross sectional view of the door of FIG. 3 taken along plane 4—4.
Figure 5:
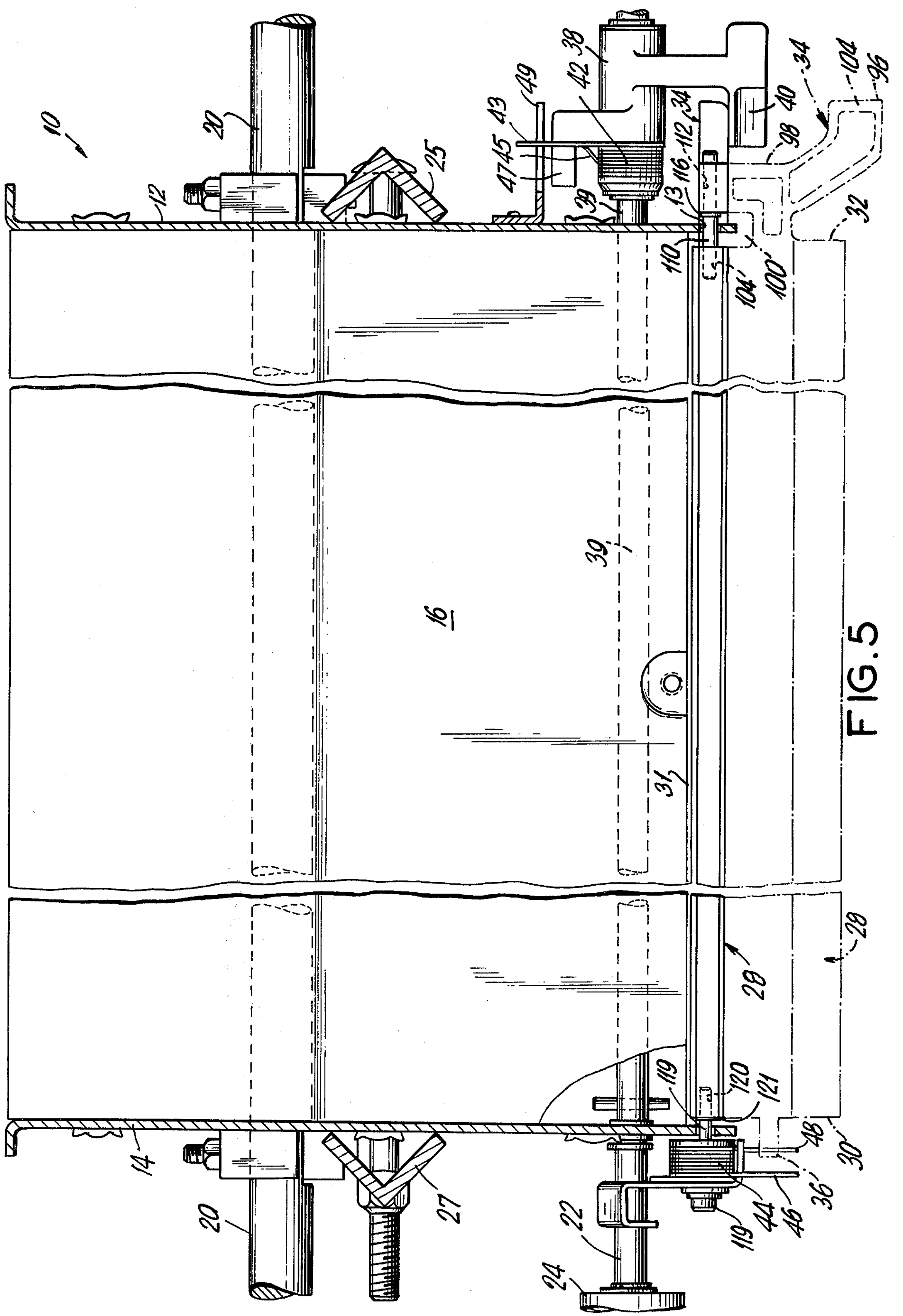
FIG. 5 is a cross sectional view of FIG. 1 taken along plane 5—5 and showing the use of the improved door on the mail sorting bin.

FIG. 5 shows a cross sectional view of the bin 10 and in this view it can be seen that the bottom each slot 18 is closed by a door 28. The door 28, as shown in FIG. 5, is the first embodiment of the present invention and is pivotable about an axis adjacent to its upper edge 31. The door 28, which is seen in detail in FIG. 3, is a rectangular member having transverse ends 30 and 32.

A trip lever 34 is provided at transverse end 32 while a tab 36 is provided at transverse end 30 of door 28. As can be best seen in FIG. 5 the trip lever 34 is supported by a moveable rocker arm 38 which is mounted on a shaft 39 and has a cam surface 40. Shaft 39 can be a continuation of shaft 22 which extends transversely across bin 10. A spring 42 has torsion ends 43 and 45 which bias the extending portion 47 of the rocker arm 38 so that the rocker arm 38 is held in engagement with the end of trip lever 34 thereby holding door 28 in a closed position and preventing the mail contained in the bin slot 18 above from falling out. A tab 49 extending outwardly from bin side 12 holds the ends 43 and 45 of spring 42 in position to bias the rocker arm 38.

Means not relevant to the present invention are disposed around the track on which the bin 10 operates to move the rocker arm 38 at appropriate predetermined times and to thereby permit trip lever 34 to move off rocker arm 38 and door 28 to open the tab 36 at end 30 of door 28 is engaged between two oppositely biased ends 46 and 48 of a torsion spring 44. While the door 28 is held closed by the pressure of rocker arm 38 on trip lever 34 the first end 48 of the torsion spring biases the door 28 toward its open position so that when trip lever 34 is released by the motion of rocker arm 38 the door 28 opens. The second end 46 of the torsion spring 44 damps the opening motion of the door to decrease noise.

After the door 28 is opened and mail is dropped, upwardly projecting members disposed along the track in the post office push the doors 28 toward their closed position causing the trip lever 34 to ride over cam surface 40 and to again be supported by rocker arm 38 so that the door is held in a closed position. As the door 28 closes end 48 of the torsion spring back biases it to decrease the resulting noise and to prepare the door to open when the rocker arm 38 is next moved.

Figure 6:
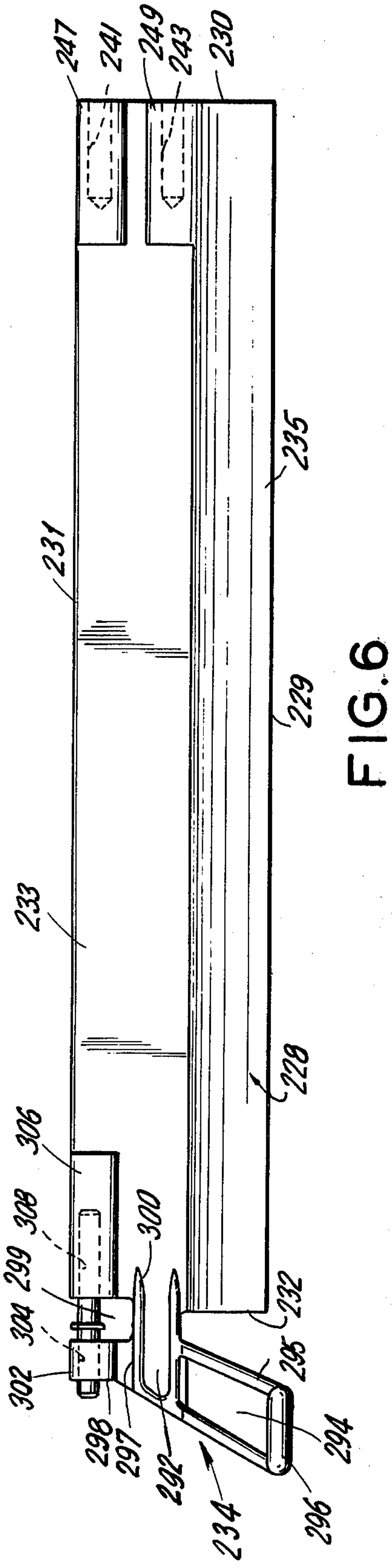
FIG. 6 is a frontal view of a second embodiment of the improved door to be used with the mail sorting bin of FIG. 1.
Figure 8:
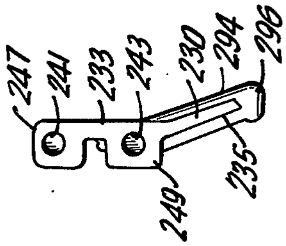
FIG. 8 is an end view of the other end of the door of FIG. 6.
Figure 7:
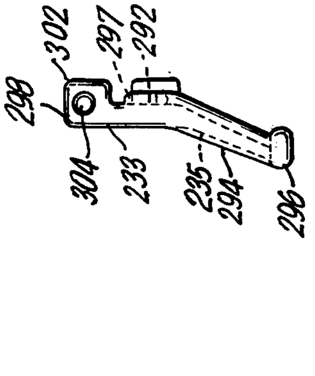
FIG. 7 is an end view of one of the ends of the door of FIG. 6.

The detailed configurations of two embodiments of the door 28 are shown in more detail in FIG. 3, 4, 6, 7 and 8. FIG. 2 shows a prior art door construction. FIGS. 3 and 4 show a first embodiment of an improved door construction which embodies the present invention, and FIGS. 6, 7 and 8 show a second such embodiment. The prior art door 50 of FIG. 2 includes a first and second transverse ends 52 and 54. First and second tabs 56 and 58 extend respectively outwardly from these transverse ends. A trip lever 60 has a first aperture 62 at its upper end and a slotlike aperture 64 at approximately its midpoint. A pin 66 having an enlarged head 67 is insertable through aperture 62 and into a recess 68 formed in the end 54 of door 50 to secure the trip lever 60 to the upper portion of the door 50. The tab 58 extends through the slotlike aperture 64 in trip lever 60 to hold the trip lever 60 in a substantially coplanar orientation with the door 50. The pin 66 passes through the side wall 12 of the bin 10 to pivotably mount the door on the bin 10. At the end 52 of door 50 the tab 56 is arranged to be grasped between the ends 46 and 48 of the torsion spring 44 as previously described. The end 52 pivots around a pin 70 which also supports the torsion spring 44. When the door 50 is mounted the pin 70 passes through side 14 of bin 10.

All of the parts of prior art door 50 were made of metal. This in itself caused a great deal of noise as the door opened and closed against the metalic bin 10. This noise was, however, greatly increased by the rattling which resulted from the flexible attachment of trip lever 60 to door end 54 by tab 58 extending through aperture 64 and pin 66 extending through apertures 62 and 68. The pin 66 rattled within apertures 62 and 68. In addition tab 58 rattled within slotlike aperture 64 in the trip lever 60. It was impossible to provide tolerances close enough to reduce this clatter appreciably without rendering the door assembly difficult and expensive to build and assemble. In addition if either the pin 66 or the tab 64 were deformed during operation the door 50 could be rendered inoperable, since the trip lever 60 would then no longer be in the necessary orientation with respect to rocker arm 38.

A first embodiment of the improved door construction of this invention, as shown in FIGS. 3 and 4, is formed of a resilient sound damping material such as plastic and includes a first and second transverse ends 30 and 32 and a top edge 31. The trip lever 34 is formed integrally with the door 28 so that it is substantially coplanar with the door 28 and extends outwardly from transverse end 32.

The trip lever 34 has a first portion 92 which extends outwardly from transverse end 32 to space the trip lever 34 from the end 32 of the door 28. A second portion 94 of trip lever 34 extends downwardly and outwardly from portion 92 and terminates in a portion 96 which is substantially parallel to the axis of door 28. A third portion 98 of trip lever 34 extends upwardly from portion 92 to a point approximately level with the upper edge 31 of the door 28 to define an aperture 100 between trip lever portion 98 and door end 32.

As best seen in the cross sectional view of FIG. 4 the door includes an upper portion 107 oriented in a substantially vertical plane when the door is open as illustrated in FIG. 4. A lower portion 109 angles inwardly to insure adequate closure of the bin slot when the door is in the closed position. If the lower portion 109 defines an angle of about 25 degrees with a plane defined by the upper portion 107 a superior door construction results. Preferably the upper portions 92 and 98 of trip lever 34 are substantially coplanar with door upper portion 107 while the lower lever portion 94 of trip lever 34 is angled so as to be substantially coplanar with lower door portion 109.

At the opposite transverse end 30 of door 28 a tab 36 is formed integrally with door 28 and extends outwardly from end 30 thereof. Again the tab 36 will normally be coplanar with door 28 and a suitable slotlike aperture will be provided in bin side wall 14 to permit the tab to extend through the wall. Alternatively this tab can be an L shaped member extending downwardly within the bin wall and then out under bin wall 14 to a point where it can be engaged by the ends of the torsion spring 44 as described above. The configuration is discussed more fully in U.S. Pat. No. 4,022,340. If desired a metal jacket or coating 102 can be attached about the outer surface of tab 36 to strengthen this member since this tab will come in contact with metallic torsion springs end 46 and 48. The body of the tab 36, since it is formed integrally with the door 28, will of course be the same resilient material as the door; and the metallic jacket can prevent undesirable wear by the metal ends of the torsion spring.

If desired a rib 104 can be formed about the periphery of trip lever portions 94 and 96 or alternatively as shown in figure three this peripheral rib can be continued as in 105 around the entire periphery of trip lever 34. Additionally longitudinal support ribs 106 and 108 may be formed along and adjacent to the upper surface 31 of door 28. All of these additional thicknesses of material serve to strengthen the resilient material of the door 28 at points of stress.

A pin is passed through an aperture 112 in portion 98 of the trip lever 34 and into a corresponding aligned aperture 114 in door end 32. The bin side 12 passes through aperture 100 as shown in FIG. 5 and includes a suitable aperture 13 to permit the passage of pin 110. A retaining ring 116 is provided to lock the pin 110 in place. A pin 119 which is shown in FIG. 5 is insertable in aperture 120 in end 30 of door 28. This pin passes through side 12 of bin 10 and is similarly locked by a retaining ring 121. In this matter the door 28 is pivotably mounted about an axis substantially along its upper edge 31 between the longitudinal walls of bin 10.

A second embodiment of the improved door construction of the present invention is shown in FIGS. 6, 7 and 8. FIG. 6 shows a door 228 made of plastic or other resilient sound damping material and includes a first transverse end 230, a second transverse end 232, a top edge 231 and a bottom edge 229. A trip lever 234 is formed integrally with the door 228 and extends outwardly and downwardly from the end 232. The main body of door 228 includes an upper portion 233 which is oriented substantially vertically when the door is open and a lower portion 235 which angles inwardly as seen in FIG. 8 from the upper portion. It has been found that a superior door structure results when the lower portion of the door 235 defines an angle of about 25 degrees with the plane of the upper portion 233 of the door.

The first transverse end 230 of the door has an upper and lower bore 241 and 243 formed respectively in raised areas 247 and 249 which extend inwardly from end 230. A pin, which is not shown, extends through an aperture in bin side 14 and into upper aperture 241 to pivotably attach the end 230 of door 228 to the bin 10. If desired a second pin can be mounted in aperture 243. This pin would have a projecting end which would perform the same function as projecting tab 36. For ease of mounting this pin may be spring biased so that it retracts into bore 243 during mounting. Preferably this pin will be fabricated of metal since it must interact with metallic torsion spring 44.

The trip lever 234 has a longitudinally extending portion 292 which is formed integrally with and extends outwardly from transverse end 232 to space the trip lever 234 from the end 232. The lever portion 294 of the trip lever 234 extends downwardly and outwardly at an angle from portion 292. The outer end of downwardly extending portion 292 terminates in a thickened portion 296 which extends across the lower end of portion 292 and is raised above the planar surface of this portion as best seen in the end view of FIG. 7. A raised portion 295 extends about the remainder of the periphery of portion 294. Raised portions 295 and 296 strengthen the lever portion 294 which is subject to frictional forces during operation of the door.

A substantially U shaped raised area 297 borders the periphery of the longitudinally extending portion 292. The raised area 297 gradually decreases at its inner ends 300 to reach the surface of door portion 233. This again strengthens the plastic material of the door.

A third portion 298 of the trip lever 234 extends from longitudinal portion 292 to a point substantially equal to the upper edge 231 of door 228 and is substantially coplanar with portion 292. Portion 298 is spaced from end 232 of the door to define aperture 299 to permit the passage of bin side 12. The upper end of portion 298 is raised to form a thicken area 302. An aperture 304 is formed through thicken area 302. A raised thickened area 306 extend inwardly from end 332 along the upper edge of door 228 substantially in alignment with portion 302. A bore 308 is formed in raised portion 306 and is aligned with aperture 304. A pin 310 extends through aperture 304 across aperture 299 through a mating aperture in bin side 12 and into bore 308 to mount the second end 232 of the door on the bin. A locking ring 316 serves to hold pin 310 in place through bin side 12.

The lever portion 294 of trip lever 234 is of a substantially rectangular shape flaring at its bottom 296. The lever portion 294 forms an angle of about 25 degrees with the plane of portion 292 so that lever portion 294 is substantially coplanar with the angled lower portion 235 of door 228. This relationship is best seen in the end view of FIG. 7.

In a door having a height of about 1.33 inches from its upper edge 231 to its lower edge 229 the lower end 296 of the lever portion 294 should preferably extend downwardly a distance of about 1.5 inches measured from upper door edge 231. The lever portion 294 is preferably angled outwardly with respect to a plane parallel to the door end 232 at an angle in the range of 20° to 30°. The outer end of bottom portion 296 of lever portion 294 preferably is spaced about 1.0 to 1.2 inches from transverse end 232 of the door.

In the substantially rectangular configuration of the lever portion as shown in FIG. 6 it is preferable if the lower edge 296 flares slightly with respect to the upper portion which connects with longitudinal portion 292. This can be accomplished by angling the inner edge 295(*a*) of portion 294 at an angle of about 23 degrees with respect to a plane parallel to the transverse end 232 of door 228 and angling the outer edge 295(*b*) at an angle of about 30 degrees with respect to a plane parallel to door end 232.

The use of improved door 28 or 228 eliminates the rattling found in the prior art door mounting because the trip lever is formed integrally with the body of the door. Since the door 28 is formed of a resilient sound damping material the clatter associated with the opening and closing of the prior art doors is greatly reduced. The improved door construction has the further advantage of being less expensive to make since the whole structure of FIG. 3 or 6 can be molded of inexpensive plastic. The improved door construction disclosed above is also cheaper and easier to install since there is no need to fit a tab through a slot in the trip lever.

What is claimed is:

1. An improved door for a mail transporting bin said bin having first and second longitudinal side walls; a plurality of transverse partitions disposed between said side walls to define a plurality of parallel vertical mail holding slots; each said slot being open at its top end, and closable at its bottom end by one of a plurality of doors; each of said doors being an elongated substantially rectangular member having first and second transverse ends adjacent respectively to said longitudinal side walls of said bin and an upper and a lower longitudinal edges which are substantially perpendicular to the side walls of said bin; and being pivotably mounted between the side walls of said bin about an axis adjacent to and extending along said upper longitudinal edge of said door; bias means to urge each of said doors toward an open position and a movable member arranged to hold each of said doors in a normally closed position, said improved door being formed of a resilient sound damping material and including;

a trip lever integrally formed with said door, said trip lever being substantially coplanar with said door and having a longitudinal portion extending outwardly from said first transverse end of said door, a lever portion extending generally downwardly and outwardly from said longitudinal portion to a point where said lever portion is engageable by said movable member and an attachment portion extending generally upwardly from said longitudinal portion to a point approximately even with said upper longitudinal edge of said door, said attachment portion being spaced from said first transverse end of said door to define an aperture therebetween; and means to pivotably attach said door between said longitudinal sides of said bin such that one longitudinal side of said bin extends through said aperture defined by said trip lever and said first transverse end of said door.

2. An improved door as claimed in claim 1 in which said lever portion of said trip lever has a raised portion formed about its periphery and a longitudinally disposed lower edge which is engageable by said movable member, said lower edge being substantially parallel to said lower longitudinal edge of said door.

3. An improved door as claimed in claim 1 in which said lever portion of said trip lever extends outwardly and downwardly from a plane defined by the transverse end of said door at an angle within the range of 20° to 30°.

4. An improved door as claimed in claim 3 in which said lever portion includes a transversely disposed portion extending outwardly at the bottom of said lever portion substantially parallel to said lower longitudinal edge of said door.

5. An improved door as claimed in claim 3 in which said lever portion is rectilinear member and includes a thickened portion disposed along said lower edge.

6. An improved door as claimed in claim 5 in which the inner side of said rectilinear member forms an angle of about 23° with the plane defined by said first transverse end of said door and the outer side of said rectilinear member forms an angle of about 30° with the plane defined by said first transverse end of said door.

7. An improved door as claimed in claim 1, in which said attachment portion of said trip lever has a first aperture extending therethrough, and said first transverse end of said door has a second aperture formed therein which second aperture is aligned with said first aperture; and in which said means to pivotally attach said door includes a pin configured to fit through said aligned apertures in said door and a suitable aperture extending through said one longitudinal side wall of said bin, and locking means to hold said pin in place within said apertures.

8. An improved door as claimed in claim 1 including an integrally formed tab projecting from said second transverse end of said door said tab being engageable by said bias means.

9. An improved door as claimed in claim 8 including a metallic jacket attached over at least a portion of the surface of said tab.

10. An improved door as claimed in claim 1 in which said second transverse end of said door has at least one aperture formed therein, and means including a pin configured to fit in said aperture to pivotally attach said door to said second longitudinal wall of said bin.

11. An improved door as claimed in claim 10 in which said second transverse end of said door has a second aperture formed therein said second apertures being lower than said at least one aperture and a spring biased pin configured to fit within said second aperture and extend outwardly therefrom.

12. An improved door as claimed in claim 1 in which said door includes an upper portion adjacent to said upper longitudinal edge and a lower portion adjacent to said lower longitudinal edge and said lower door portion forms an angle of approximately 25° with respect to a plane defined by said first portion, said longitudinal and attachment portions of said lever member being substantially coplanar with said upper portion of said door and said lever portion of said lever member being substantially coplanar with said lower portion of said door.

13. An improved door as claimed in claim 1 in which said resilient material is plastic.

* * * * *